United States Patent [19]

Diedrich et al.

[11] 4,118,947
[45] Oct. 10, 1978

[54] LOW THERMAL LOSS CRYOGENIC CONTAINERS FOR INFRARED RADIATION DETECTING DEVICES, WITH INTEGRATED FEED-THROUGH CONNECTIONS

[75] Inventors: Karl Heinz Diedrich; Carlo Misiano; Enrico Simonetti; Marco Fazi, all of Rome, Italy

[73] Assignee: Selenia-Industrie Elettroniche Associate S.p.A., Italy

[21] Appl. No.: 798,276

[22] Filed: May 19, 1977

[51] Int. Cl.² .............................................. F25B 19/00
[52] U.S. Cl. ................................... 62/514 R; 250/352
[58] Field of Search ........................ 62/514 R; 250/352

[56] References Cited

U.S. PATENT DOCUMENTS

| 3,006,157 | 10/1961 | Haettinger et al. | 62/514 R |
| 3,258,602 | 6/1966 | Promish | 62/514 R |
| 3,358,463 | 12/1967 | Hawkins et al. | 62/514 R |
| 3,363,207 | 1/1968 | Brechna | 62/514 R |
| 3,807,188 | 4/1974 | Lagodmos | 62/514 R |

*Primary Examiner*—Ronald C. Capossela
*Attorney, Agent, or Firm*—Beveridge, De Grandi, Kline & Lunsford

[57] ABSTRACT

A cryogenic container with low thermal losses for infra-red detecting devices, with integrated feed-through connections, wherein said container consists of two elements adapted to have their outer walls joined, the two walls having two edges with surfaces facing one another to define an annular zone arranged to receive vacuum sealed feed-through connections in the form of a substrate on which a multiplicity of conductors is formed by micro-circuitry techniques. The conductors extend through the annular zone and project both inward and outward of the outer wall. A flexible element is provided for contacting an active element inside the cryostat with the conductors. The flexible element consists of a layer of plastic material supporting a multiplicity of conductive tracks.

4 Claims, 3 Drawing Figures

LOW THERMAL LOSS CRYOGENIC CONTAINERS FOR INFRARED RADIATION DETECTING DEVICES, WITH INTEGRATED FEED-THROUGH CONNECTIONS

The present invention relates to a low thermal loss cryogenic container for infra-red detecting devices, with integrated feed-through connections.

In the embodiment of radiation detecting devices, particularly for radiations in the visible spectrum and in the near medium spectrum and far infra-red spectrum, operating at cryogenic temperatures, the problem appears of embodying the arrangement of electric contacts for reaching, from the outside at room temperature, the inside, sensitive to the radiations and kept at cryogenic temperatures, due to the fact that it is necessary to embody a multiplicity of contacts and at the same time to keep at a reasonable level the thermal losses through the unit of the contact elements, in order to reduce the requisites imposed on the cryogenic generator.

According to the present techniques, the arrangements of electric contacts are embodied by metal-glass or metal-glass-metal feed-through connections. These arrangements, on one hand do not allow the embodiment of a high number of interconnections, and on the other hand are not very effective from the standpoint of the containment of the thermal losses.

Taking account of the fact that the arrangement of the electric contacts must be vacuum sealed, up to now no satisfactory alternative has been found to the glass-metal weldings.

According to the present invention, the electric through connections are provided in micro-circuit form integrated on low vapour tension plastic substrates, or ceramic substrates which will be assembled to the body of the cryogenic container by cementing with a sealing agent, in case of plastic substrates, or by soft soldering in case of ceramic substrates.

The present invention will be now described with reference to certain embodiments thereof at present preferred, shown by way of non limitative example, and with reference to the figures of the attached drawings, wherein.

Figure 1:
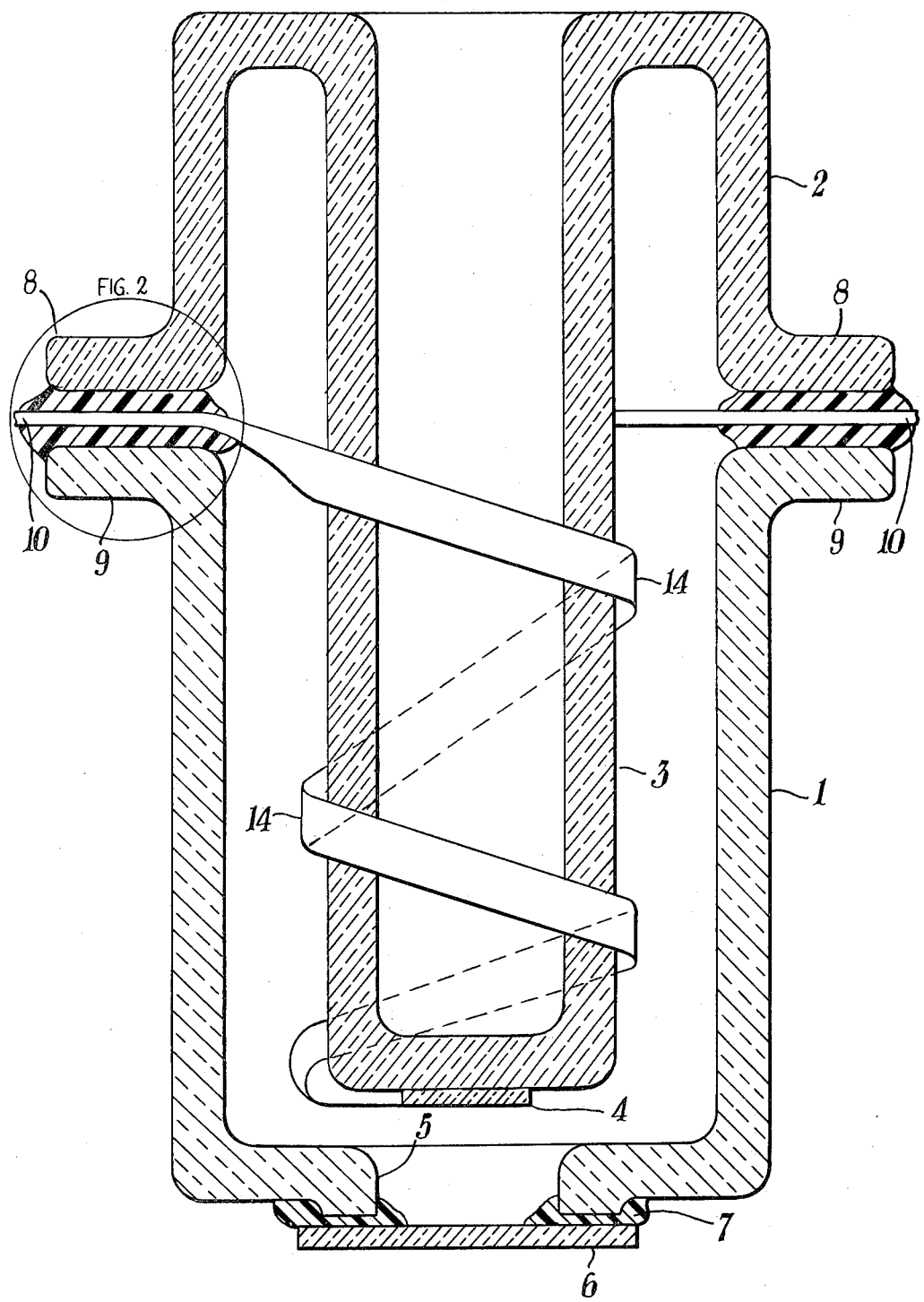
FIG. 1 shows a sectional view of a cryogenic container provided with the contact system according to a first embodiment of this invention.

With reference to the drawings, and particularly to FIG. 1, a typical cryostatic container includes a first element 1, and a second element 2. The element 2 includes in a known way a "cold finger" element 3 to which a photo-detector 4 is fixed in register with an aperture 5 in the element 1, closed by an opitcal window 6 vacuum sealed by a sealing agent 7.

The elements 1 and 2 are provided with edges 9 and 8, respectively, whereon a vacuum sealing is embodied and the through passage of the arrangement of the feed-through contacts 10 occurs.

Figure 2:
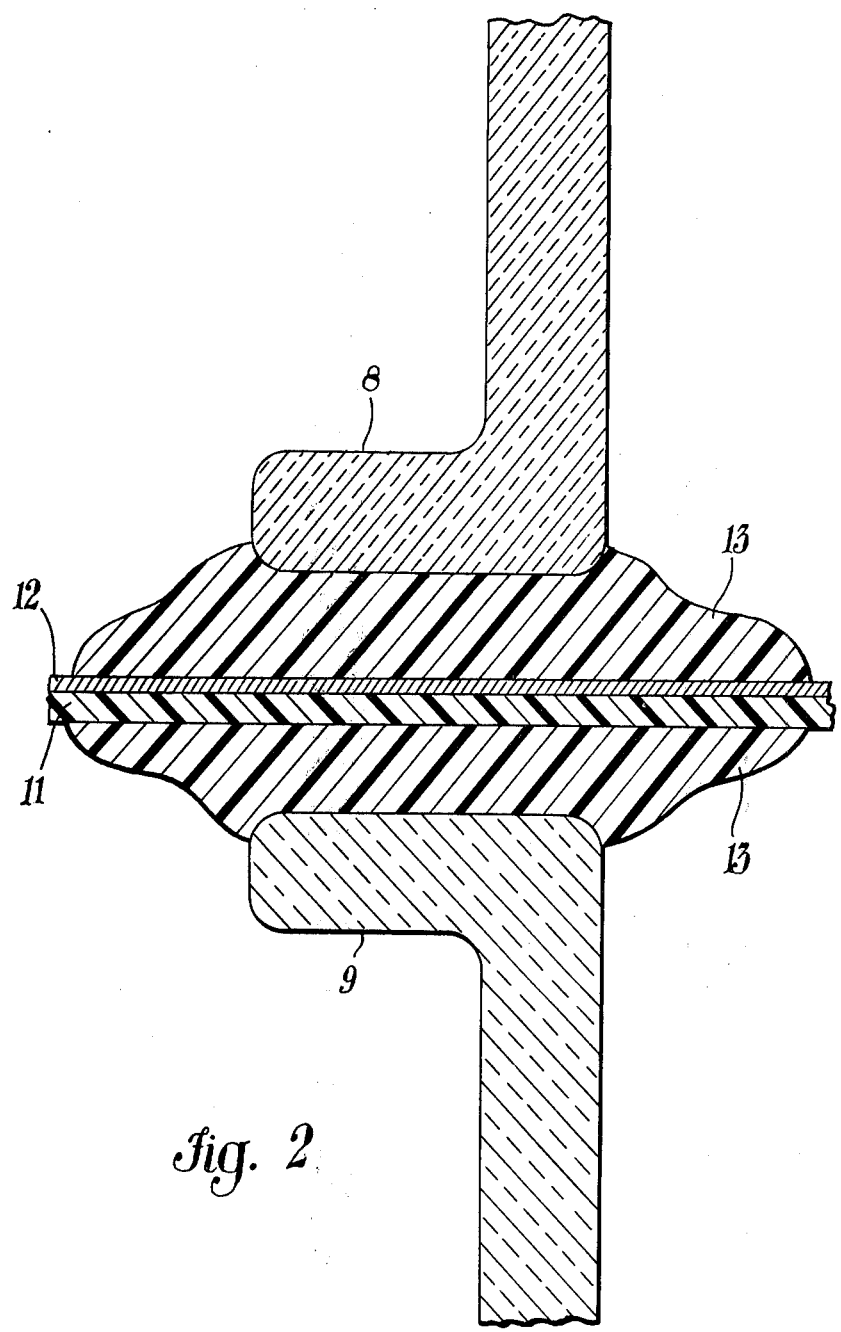
FIG. 2 shows the detail in sectional view of the zone of the vacuum seal feed-through connection of the structure of FIG. 1.
Figure 3:
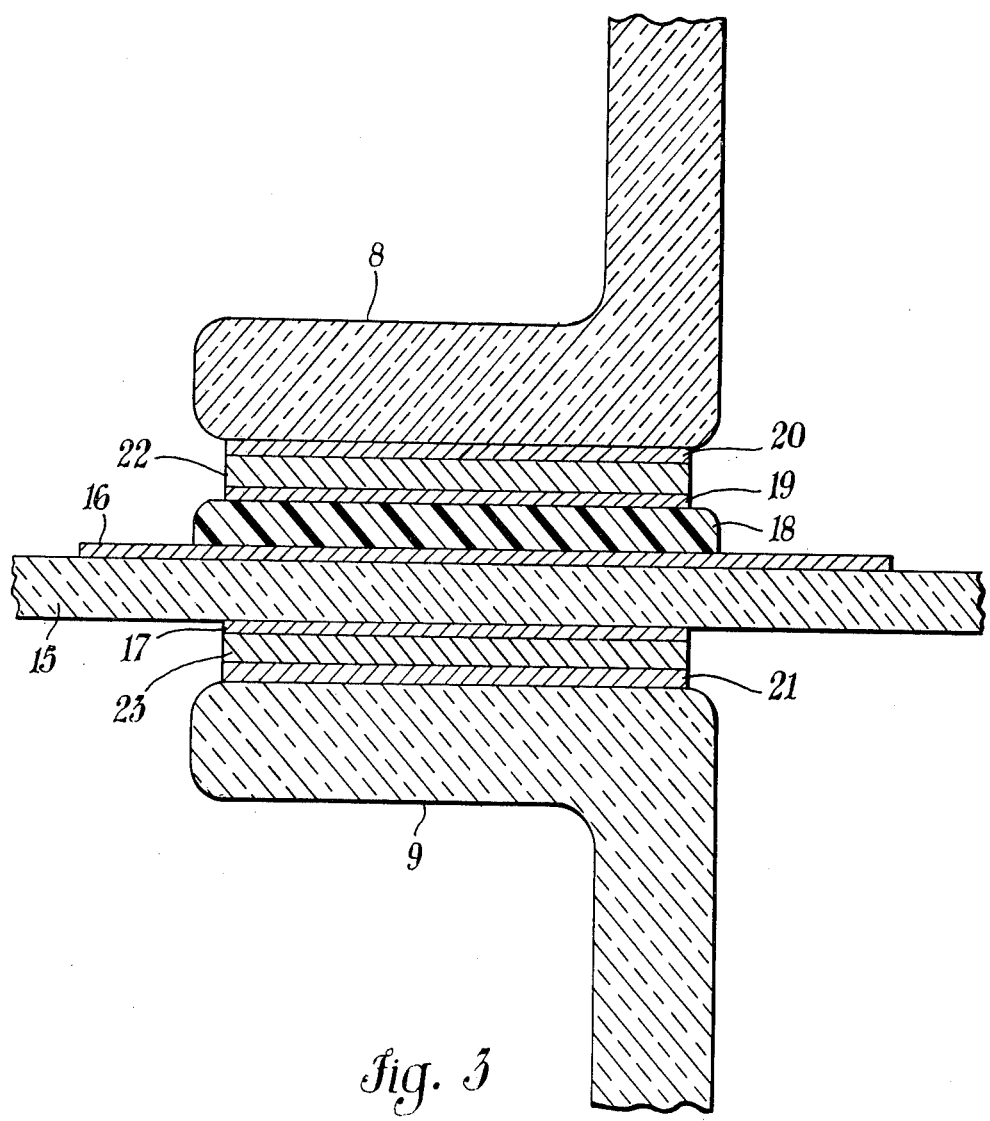
FIG. 3 shows the detail in sectional view of the zone of the vacuum seal feed-through connection according to a second embodiment of this invention.

The sealing zone of the edges 8, 9 has been shown in enlarged scale in FIGS. 2 and 3. The FIG. 2 shows an arrangement of feed-through contacts comprising a substrate of plastic material having a low vapour tension, such as a polyimide, denoted generally by 11, provided with metal tracks 12 embodied on said substrate 11 by techniques known and used for forming printed circuits.

Between the substrate 11, with the tracks 12 thereon, and the faced surfaces of the edges 8, 9 a high vacuum sealing material 13 is interposed (for instance the material marketed by the U.S. firm Varian, under the trade name "Torr-Seal"). The tracks 12 form a "strip line" which extends up the photodetector unit 4 (FIG. 1), with a spiral path 14 along the "cold finger" 3 of the cryostat. The connection between the strip line and the photo-detector unit 4 is made by the known bonding techniques.

The FIG. 3 shows a variant wherein the arrangement of the feed-through contacts comprises a ceramic substrate 15 provided with the strip line tracks 16. The underside of the substrate 15 is provided with a metallization 17, while the overside carries an insulating layer 18 to which a metallization 19 is applied. The faced surfaces of the edges 8, 9 are provided with the metallizations 20, 21 respectively. These elements are associated to one another, in a vacuum sealing way, by a solder alloy 22, 23.

Inside the cryostat (in the right-hand part with respect to FIG. 3) the connections to the photo-detector unit are carried out as shown in FIG. 1, by a spiral strip of plastic material carrying the necessary number of tracks.

By the through connection system according to the present invention, it is possible to bring to outside of the cryostat a large number of connections, while keeping the thermal losses in acceptable values. It will be also possible to provide a number of connections far greater than that possible by the conventional systems, with the added advantage of a far lower cost for each connection point.

The present invention has been described with reference to certain embodiments at present preferred, being however understood that variants and modifications could be adopted by a person skilled in the art, without thereby departing from the scope of the present invention.

Having thus described the present invention, what is claimed is:

1. A cryogenic container, with low thermal losses, for infra-red detecting devices, with integrated feed-through connections, comprising a first container element provided with an outer wall having an edge with an edge surface; a second container element provided with an outer wall having an edge with an edge surface facing said first container element edge surface to define an annular zone; a substrate within the annular zone; a plurality of conductors formed on said substrate by micro-circuitry techniques, said conductors extending through said annular zone and projecting both inwardly and outwardly of said container; a flexible element within said container and consisting of a layer of plastic material and a plurality of conductive tracks on said plastic material, said conductive tracks having one end connected to said conductors and another end adapted for connection to an active element inside said container.

2. A cryogenic container as claimed in claim 1 in which said substrate is a ceramic substrate and said plurality of conductors comprises a further plurality of conductive tracks.

3. A cryogenic container as claimed in claim 2 in which said edge surfaces are metallized and said ceramic substrate is connected by soft soldering to said metallized surfaces.

4. A cryogenic container as claimed in claim 1 further comprising a high vacuum sealing material sealing said substrate and said plurality of conductors to said edge surfaces within the annular zone.

* * * * *